May 20, 1952   S. BIRCSAK   2,597,058

MOTOR VEHICLE BUMPER

Filed July 12, 1947

STEPHEN BIRCSAK
INVENTOR.

BY

Patented May 20, 1952

2,597,058

UNITED STATES PATENT OFFICE 2,597,058

MOTOR VEHICLE BUMPER

Stephen Bircsak, Newark, N. J.

Application July 12, 1947, Serial No. 760,679

3 Claims. (Cl. 293—74)

This invention relates to a safety bumper for automobiles, primarily designed to prevent accidents which occur as a result of a passing automobile becoming hooked to a bumper of a second car or other object.

Serious accidents have been caused by the bumpers of two cars traveling on a highway becoming hooked or inter-engaged, causing damage to the cars or automobiles, tying up traffic and, in some instances, resulting in deaths of persons riding in the motor vehicle.

An object of the present invention is to provide a practical, neat appearing bumper structure which will yield when engaging or hooking another bumper or object to release the contact or engagement and permit the cars to proceed without accident, and which will snap back or return to its normal position as soon as the contact or engagement is fully released.

Another object of the invention is to provide a bumper for motor vehicles wherein all of the working parts of the bumper are enclosed and protected from dust, dirt or foreign material which might interfere with its operation or cause excessive wear on and deterioration of the working parts.

A further object of the invention is to provide a releasable safety bumper for motor vehicles as specified, which is neat and streamlined in appearance and will not detract from the appearance of the motor vehicle upon which it is mounted.

With these and other objects in view, as may appear from the accompanying specification, the invention consists of various features of construction and combination of parts, which will be first described in connection with the accompanying drawings, showing a motor vehicle bumper of a preferred form embodying the invention, and the features forming the invention will be specifically pointed out in the claims.

Referring more particularly to the drawings, the improved safety bumper includes the main bumper body 1 which is shown in the form of a substantially straight bar which may be attached to the motor vehicle indicated at "A" in any suitable approved manner. While only one end of the improved bumper is shown, it is to be understood that both ends are identical.

Figure 7:
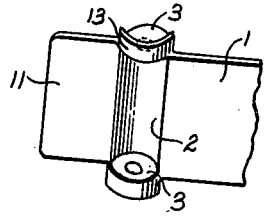
Figure 7 is a partial perspective view of the main bumper body showing the semi-cylindrical hinge barrel.
Figure 1:
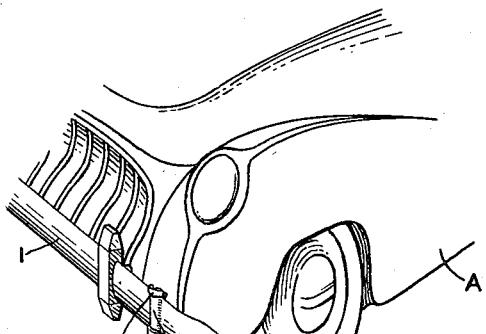
Figure 1 is a fragmentary perspective view of a motor vehicle showing the improved bumper applied thereto.
Figure 4:
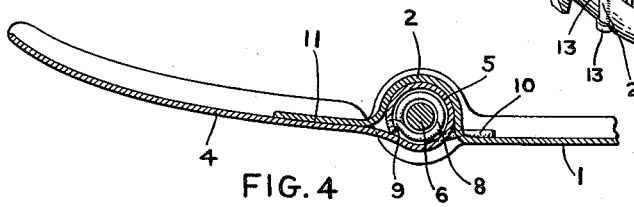
Figure 4 is a horizontal section taken on the line 4—4 of Figure 2.
Figure 2:
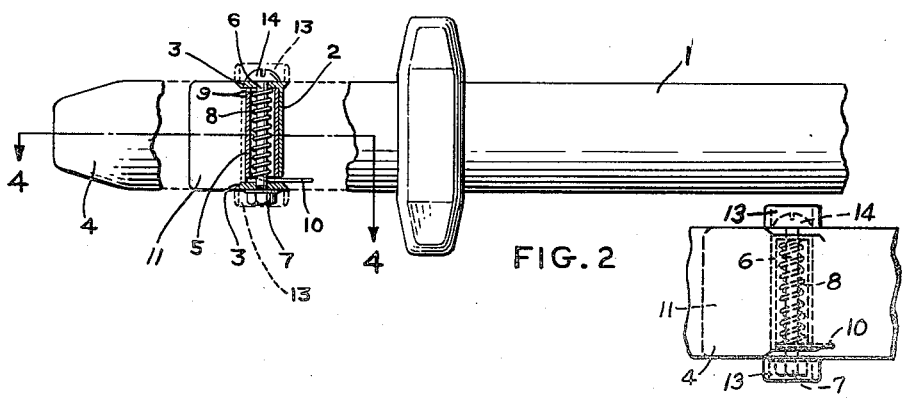
Figure 2 is a fragmentary front view of the improved bumper having parts broken away.
Figure 6:
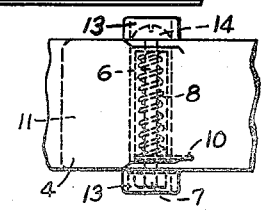
Figure 6 is a partial front view of the invention.
Figure 3:
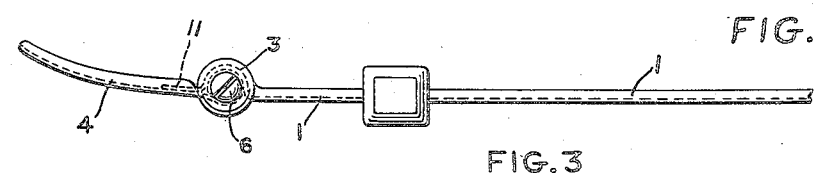
Figure 3 is a fragmentary top plan of the improved bumper.
Figure 8:
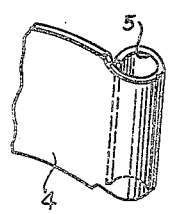
Figure 8 is a partial perspective view of one of the guard arms showing the hinge barrel thereon.
Figure 5:
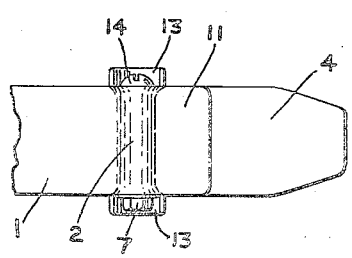
Figure 5 is a fragmentary rear elevation of the bumper.

Each side of the main bumper body 1 is shaped to form a substantially semi-cylindrical hinge barrel 2 extending transversely thereacross. The ends of the semi-cylindrical hinge barrel 2 are closed by closure plates 3 formed as an integral part of the main bumper along the inner circumference of the semi-cylindrical hinge barrel 2, perpendicular to the axial line of said semi-cylindrical hinge barrel 2. Guard arms 4 are provided which may be of any approved shape or configuration to provide an artistic appearance, and each of these guard arms 4 has its inner end shaped to form a hinge barrel 5 which fits into the semi-cylindrical hinge barrel 2, as clearly shown in Figure 4 of the drawings. A hinge bolt 6 extends through the closure heads 3 and through the hinge barrel 5 being held in place by a nut 7 which is threaded on the hinge bolt 6 and engages against the under surface of the lower closure head 3. A spring 8 is coiled about the hinge bolt 6 and it has one end engaging the hinge barrel 5 as shown at 9 and the other end engaging the inner surface of the main bumper body 1, as shown at 10. The spring is tensioned so as to urge the guard arm 4 on its pivotal connection with the main body, as provided by the hinge barrels 2 and 5 and hinge bolt 6 into its rearward position. The rearward movement of the guard arms 4 under action of their springs 8 is limited by the step extension 11 which is formed as an extension of the main bumper body 1 and projects beyond the substantially semi-cylindrical barrels 2, as clearly shown in Figure 4 of the drawings.

The end plates 3 have guard flanges 13 formed thereon which hide and protect the head 14 of the hinge bolt 6 and the nut 7, performing the dual function of adding to the appearance of the bumper, from the front view and protecting the head 14 and nut 7 from being struck by foreign matter during travel of the motor vehicle.

It will be seen from the drawings that the hinge bolt 6 and the spring 8 are fully enclosed and that the interiors of the hinge barrels are also fully enclosed so as to protect the working parts of the bumper from dirt, dust or other foreign matter which might cause excessive wear thereon or result in early deterioration of the working parts.

In the event that the bumpers of two passing cars become hooked or engaged, the force of movement will cause the guard arms 4 to spring forward laterally of the main body 1 to release the hooking connection or engagement of the bumpers and permit the cars to proceed without causing an accident.

It will be understood that the invention is not to be limited to the specific construction or arrangement of parts shown, but that they may be widely modified within the invention defined by the claims.

What is claimed is:

1. In a motor vehicle bumper, a main bumper body, each end of said main bumper body shaped to form a substantially semi-cylindrical hinge barrel, barrel end closure heads formed in the axial line of said substantially semi-cylindrical hinge barrels, guard arms, substantially cylindrical hinge barrels formed on the inner ends of said guard arms and fitting in said substantially semi-cylindrical hinge barrels, hinge bolts extending through said hinge barrels, springs about said hinge bolts and engaging said main body and guard arms to urge the guard arms into substantially aligning longitudinal relationship with said main body, said ends of said main bumper body having extensions beyond said substantially semi-cylindrical hinge barrels for flat engagement with the inner sides of said guard arms for limiting the hinge movement of the guard arms in one direction and maintaining them in proper longitudinal relationship with the main bumper body.

2. A motor vehicle bumper as claimed in claim 1 wherein said closure heads have upstanding guard flanges formed thereon for guarding and hiding the ends of the hinge bolts.

3. In a motor vehicle bumper, a main bumper body, each end of said main bumper body shaped to form a substantially semi-cylindrical hinge barrel, end closure heads for said hinge barrel formed in the axial line thereof, guard arms, substantially cylindrical hinge barrels formed on the inner ends of said guard arms adapted to fit into its respective semi-cylindrical hinge barrel between said end closure member thereon, hinge bolts passing through said end closure members and said cylindrical hinge barrels to attach said guard members to said main bumper body, a spring in each of said cylindrical barrels formed about the hinge bolts passing therethrough adapted to engage said main body and the guard arm in which it is mounted to return the guard arm into substantially longitudinal relationship with said main body when it is moved out of normal position, said ends of said main bumper body having extensions beyond said substantially semi-cylindrical hinge barrels for flat engagement with the inner sides of said guard arms for limiting the hinge movement of the guard arms in one direction and maintaining them in normal longitudinal relationship with the main bumper body.

STEPHEN BIRCSAK.

REFERENCES CITED

The following references are of record in the file of this patent:

UNITED STATES PATENTS

| Number | Name | Date |
| --- | --- | --- |
| 1,390,285 | Gahn | Sept. 13, 1921 |
| 1,554,356 | Kett | Sept. 22, 1925 |
| 1,589,549 | Palmer | June 27, 1926 |
| 1,604,256 | Bouknight | Oct. 26, 1926 |
| 1,844,216 | Erickson | Feb. 9, 1932 |
| 2,067,561 | Clarke | Jan. 12, 1937 |
| 2,222,404 | Cookenboo | Nov. 19, 1940 |